US008955914B2

(12) United States Patent
Meister et al.

(10) Patent No.: US 8,955,914 B2
(45) Date of Patent: Feb. 17, 2015

(54) LEG RESTRAINT DEVICE FOR SIDE-SEATED VEHICLE OCCUPANTS

(71) Applicant: B/E Aerospace, Inc., Wellington, FL (US)

(72) Inventors: Pete C. Meister, Miami, FL (US); Michael J. Farvet, Wellington, FL (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 13/907,079

(22) Filed: May 31, 2013

(65) Prior Publication Data
US 2014/0354020 A1 Dec. 4, 2014

(51) Int. Cl.
A47C 31/00 (2006.01)
A47D 15/00 (2006.01)
A62C 35/00 (2006.01)
B60R 21/00 (2006.01)
B60R 22/00 (2006.01)
B60N 2/427 (2006.01)
B64D 11/06 (2006.01)

(52) U.S. Cl.
CPC ............ B60N 2/42727 (2013.01); B64D 11/06 (2013.01)
USPC ...................... 297/466; 297/216.1; 297/216.2; 297/449.1; 297/451.4; 297/485; 244/122 AG; 244/122 R

(58) Field of Classification Search
USPC ........ 297/216.2, 749, 485, 466, 216.1, 449.1, 297/451.4; 244/122 AG, 122 R
See application file for complete search history.

(56) References Cited

U.S. PATENT DOCUMENTS

| 2,859,803 | A | | 11/1958 | McCallister | |
|---|---|---|---|---|---|
| 2,929,587 | A | * | 3/1960 | Martin | 244/141 |
| 3,271,797 | A | * | 9/1966 | Boyce | 156/312 |
| 3,287,064 | A | * | 11/1966 | Freeman | 297/466 |
| 3,329,464 | A | * | 7/1967 | Barwood et al. | 297/465 |
| 3,424,408 | A | * | 1/1969 | Martin | 244/122 R |
| 4,183,582 | A | | 1/1980 | Taki | |
| 4,229,039 | A | * | 10/1980 | Day | 297/232 |
| 4,720,064 | A | * | 1/1988 | Herndon | 244/122 AG |
| 5,040,522 | A | * | 8/1991 | Daniels | 601/24 |
| 5,046,687 | A | * | 9/1991 | Herndon | 244/122 AG |
| 5,301,903 | A | * | 4/1994 | Aronne | 244/122 AG |
| 5,342,116 | A | * | 8/1994 | Walton | 297/466 |
| 5,556,056 | A | | 9/1996 | Kalberer et al. | |
| 5,695,242 | A | | 12/1997 | Brantman et al. | |
| 6,217,059 | B1 | | 4/2001 | Brown et al. | |
| 7,118,180 | B1 | * | 10/2006 | Tanaka et al. | 297/485 |
| 7,198,288 | B2 | | 4/2007 | Kim et al. | |
| 8,020,939 | B2 | * | 9/2011 | Stasiak et al. | 297/466 |

(Continued)

FOREIGN PATENT DOCUMENTS

WO 2013001289 A1 1/2013

OTHER PUBLICATIONS

International Search Report and Written Opinion dated Sep. 30, 2013.

Primary Examiner — Chi Q Nguyen
(74) Attorney, Agent, or Firm — Shumaker, Loop & Kendrick, LLP

(57) ABSTRACT

A leg restraint is provided for side-seated vehicle occupants, such as aircraft passengers, and includes a leg-restraining member mounted in proximity to a side-facing vehicle seat and is selectively moveable between a deployed, laterally-extending leg-protecting position and a retracted, non-leg interfering position.

10 Claims, 6 Drawing Sheets

(56) References Cited

U.S. PATENT DOCUMENTS

| | | |
|---|---|---|
| 2003/0184061 A1 | 10/2003 | Honda et al. |
| 2004/0026905 A1 | 2/2004 | Kim et al. |
| 2005/0127654 A1 | 6/2005 | Johansson et al. |
| 2011/0012329 A1 | 1/2011 | Sekino et al. |
| 2011/0043028 A1 | 2/2011 | Basile |
| 2011/0272929 A1 | 11/2011 | Fukawatase et al. |

* cited by examiner

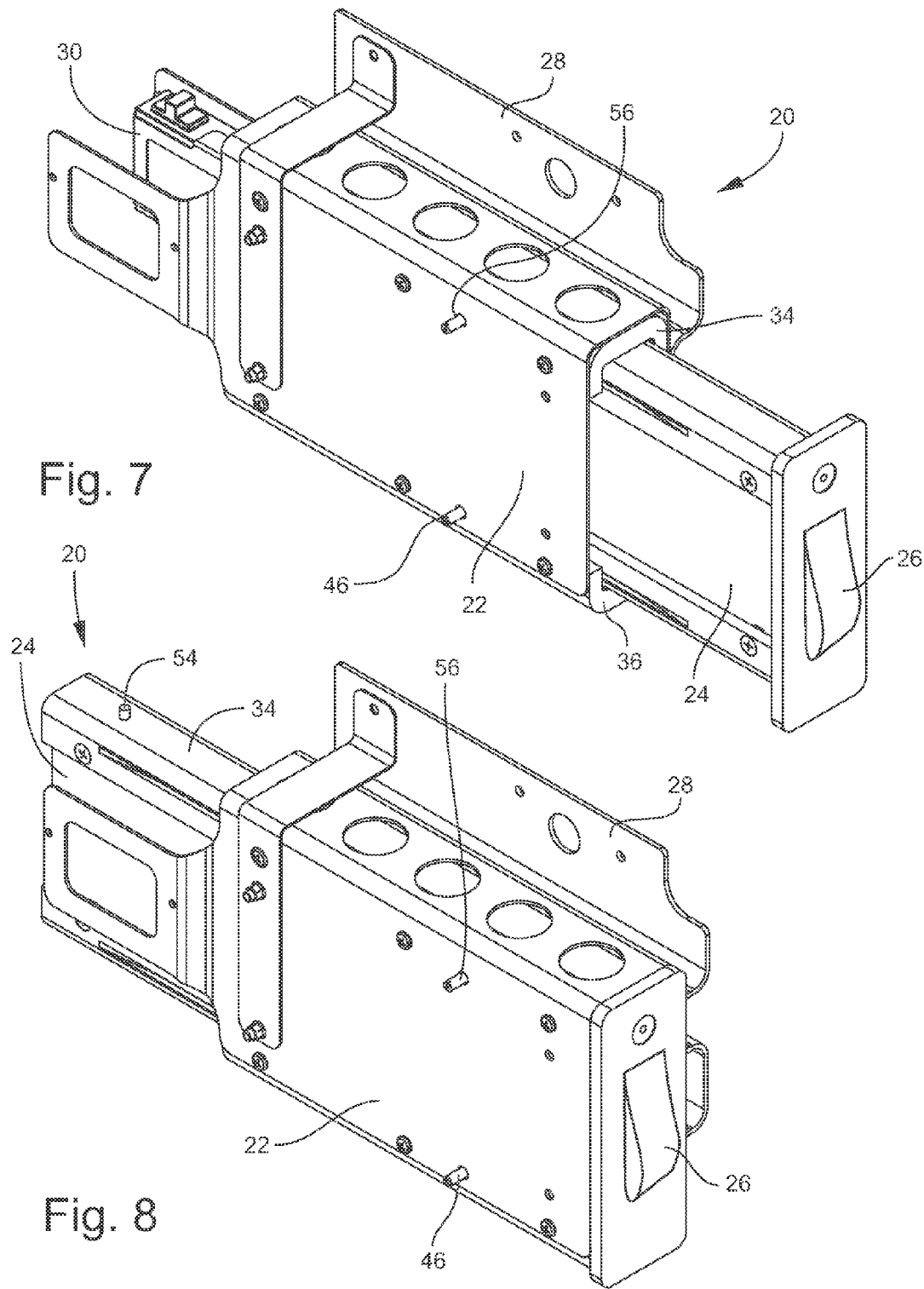

LEG RESTRAINT DEVICE FOR SIDE-SEATED VEHICLE OCCUPANTS

TECHNICAL FIELD AND BACKGROUND OF THE INVENTION

The present invention relates to a leg restraint device for side-seated vehicle occupants. In particular, the invention relates to a leg restraint device for side-seated occupant of, for example, business aircraft of the type offering side-facing seats for passengers. The disclosed invention has application in any form of vehicle transportation where passenger or occupant seats may be mounted in a side-facing orientation in relation to the direction of forward travel of the vehicle, such as an aircraft. It is anticipated that a restraint device will be required to be used on FAA Part 25 side-facing seat installations where an arm rest is located just forward of the occupants.

Violent or abrupt deceleration can cause high g-force lateral loading on a side-facing passenger, causing lateral leg movement and leg rotation about the knee and femur. This can cause dislocations, muscle and tendon injuries and fractures due to the restraint exerted on the passenger's torso by seat belts and/or arm rests while the legs are unrestrained. However, belts or similar restraints on the legs are not advisable due to the additional time needed to remove the restraints, as well as the possibility that injuries to the passenger may make it difficult for either the passenger or emergency personnel to remove such restraints.

Therefore, there is a need for a type of leg restraint that provides protection to the legs of side-facing seat occupants in the event of a crash or other rapid deceleration, while not inhibiting rapid egress from the seat after the event.

SUMMARY OF THE INVENTION

It is therefore an object of the present invention to provide a leg restraint that provides protection to the legs of side-facing seat occupants in the event of a crash or other rapid deceleration.

It is another object of the invention to provide a leg restraint device that provides protection to the legs of side-facing seat occupants in the event of a crash or other rapid deceleration, while not inhibiting rapid egress from the seat after the event.

It is another object of the invention to provide a leg restraint device that provides protection to the legs of side-facing seat occupants in the event of a crash or other rapid deceleration, but that need not be deployed except during taxi, take-off and landing ("TTOL").

These and other objects and advantages of the invention are achieved by providing a leg restraint device attached to a side-facing seat that prevents leg rotation about the knee and femur by restraining the lower leg and foot of a side-facing occupant. The device is attached to the seat structure and contains a moveable panel positioned under the seat bottom that can be deployed and locked such that the primary forward impact of the occupant's foot is against a rigid restraining panel. The panel prevents the foot and lower leg from moving forward during an aircraft forward crash. After the event the panel retracts under the seat and provides free space in the aisle for occupant egress.

According to one embodiment of the invention, a leg restraint is provided for side-seated vehicle occupants, and comprises a leg-restraining member mounted in proximity to a side-facing vehicle seat and is selectively moveable between a deployed, laterally-extending leg-protecting position and a retracted, non-leg interfering position.

According to another embodiment of the invention, an impact-activated biasing member cooperates with the leg-restraining member to move the leg-restraining member into the retracted position following the impact of an occupant's leg against the leg-restraining member.

According to another embodiment of the invention, a locking member cooperates with the leg-restraining member to retain the leg restraining member in its deployed position.

According to another embodiment of the invention, the vehicle comprises an aircraft and the vehicle seat comprises an aircraft occupant seat.

According to another embodiment of the invention, a leg restraint for side-seated aircraft occupants is provided, and includes a leg-restraining member mounted in proximity to a side-facing aircraft seat and selectively moveable between a deployed, laterally-extending leg-protecting position during TTOL and a retracted, non-leg interfering position, and an impact-activated biasing member that cooperates with the leg-restraining member to move the leg-restraining member into the retracted position upon impact of an occupant's leg against the leg-restraining member. A locking member cooperates with the leg-restraining member to retain the leg restraining member in its deployed position against a biasing force towards the retracted position until an impact of an occupant's leg against the leg-restraining member.

According to another embodiment of the invention, the leg-restraining member includes a panel mounted beneath a seat bottom of the aircraft seat, the impact-activated biasing member includes a spring cooperating with the panel, and the locking member includes a locking pin carried by the panel and mounted for movement in a guide slot formed in a cap mounted on the panel, the guide slot including a notch offset to one side of the guide slot and positioned to capture the locking pin upon deployment of the panel to retain the panel in its deployed position against a biasing force applied to the panel towards the retracted position.

According to another embodiment of the invention, the panel is mounted in an elongate panel housing positioned beneath the seat bottom of the vehicle on a side of the seat most proximate to a direction of forward travel of the aircraft, and is moveable between a deployed, laterally-extending leg-protecting position during TTOL and a retracted, non-leg interfering position. The spring includes a coil spring mounted in a spring housing mounted on the panel housing such that as the panel is deployed, the coil spring is uncoiled and when the panel is retracted, the coil spring coils. A top locking pin is carried by a top side of the panel and mounted for movement in a guide slot formed in a top cap mounted on the top side of the panel. The top guide slot includes a notch positioned to capture the top locking pin upon deployment of the panel to retain the panel in its deployed position against a biasing force applied to the panel towards the retracted position. A bottom locking pin is carried by a bottom side of the panel and is mounted for movement in a guide slot formed in a bottom cap mounted on the bottom side of the panel. The bottom guide slot includes a notch positioned to capture the bottom locking pin upon deployment of the panel to retain the panel in its deployed position against a biasing force applied to the panel towards the retracted position.

According to another embodiment of the invention, at least one laterally-positioned biasing member is carried by the panel housing and imposes a lateral bias against the panel in a direction to maintain the locking pin in the notch in an offset position to one side of the guide slot when the panel is in the deployed position.

According to another embodiment of the invention, the laterally-positioned biasing member includes a spring-loaded pin adapted to be positioned in an extended position against the panel when the panel is in the deployed position, and to be moved into a retracted position against the panel by the action of the panel upon lateral deflection of the panel incident to impact by a leg of the seat occupant.

According to another embodiment of the invention, an aircraft passenger seat adapted for being positioned in a side-facing configuration in an aircraft cabin is provided, and includes a seat bottom and seat back configured to be oriented in the aircraft perpendicular to the direction of forward travel of the aircraft. A leg restraint for restraining leg movement in the direction of forward travel of the aircraft incident to an abrupt deceleration of the aircraft is provided and includes a leg-restraining member that is mounted in proximity to the aircraft seat and is selectively moveable between a deployed, laterally-extending leg-protecting position during TTOL and a retracted, non-leg interfering position. An impact-activated biasing member cooperates with the leg-restraining member to move the leg-restraining member into the retracted position upon impact of an occupant's leg against the leg-restraining member. A locking member cooperates with the leg-restraining member to retain the leg restraining member in its deployed position against a biasing force towards the retracted position until an impact of an occupant's leg against the leg-restraining member.

According to another embodiment of the invention, the leg-restraining member includes a panel mounted beneath the seat bottom of the aircraft seat, the impact-activated biasing member includes a spring cooperating with the panel, and the locking member includes a locking pin carried by the panel and mounted for movement in a guide slot formed in a cap mounted on the panel. The guide slot includes a notch offset to one side of the guide slot positioned to capture the locking pin upon deployment of the panel to retain the panel in its deployed position against a biasing force applied to the panel towards the retracted position.

According to another embodiment of the invention, the panel is mounted in an elongate panel housing positioned beneath the seat bottom on a side of the seat most proximate to a direction of forward travel of the aircraft, and moveable between a deployed, laterally-extending leg-protecting position during TTOL and a retracted, non-leg interfering position. The spring is a coil spring mounted in a spring housing mounted on the panel housing such that as the panel is deployed, the coil spring is uncoiled and when the panel is retracted, the coil spring coils. A top locking pin is carried by a top side of the panel and is mounted for movement in a guide slot formed in a top cap mounted on the top side of the panel. The top guide slot includes a notch positioned to capture the top locking pin upon deployment of the panel to retain the panel in its deployed position against a biasing force applied to the panel towards the retracted position. A bottom locking pin is carried by a bottom side of the panel and mounted for movement in a guide slot formed in a bottom cap mounted on the bottom side of the panel. The bottom guide slot includes a notch positioned to capture the bottom locking pin upon deployment of the panel to retain the panel in its deployed position against a biasing force applied to the panel towards the retracted position.

According to another embodiment of the invention, at least one laterally-positioned biasing member is carried by the panel housing and imposes a lateral bias against the panel in a direction to maintain the locking pin in the notch in an offset position to one side of the guide slot when the panel is in the deployed position.

According to another embodiment of the invention, the laterally-positioned biasing member includes a spring-loaded pin adapted to be positioned in an extended position against the panel when the panel is in the deployed position, and to be moved into a retracted position against the panel by the action of the panel upon lateral deflection of the panel incident to impact by a leg of the seat occupant.

According to another embodiment of the invention, the notches in the top and bottom guide slots include an offset segment at one end for capturing the locking pin.

According to another embodiment of the invention, an arm rest and end bay are positioned on a side of the seat most proximate to a direction of forward travel of the aircraft.

BRIEF DESCRIPTION OF THE DRAWING FIGURES

The present invention is best understood when the following detailed description of the invention is read with reference to the accompanying drawings, in which:

FIG. 7 is a perspective view from above of the leg restraint device in its deployed position;

FIG. 8 is a perspective view from above, showing the leg restraint device of FIG. 7 in its retracted position;

Figure 9:
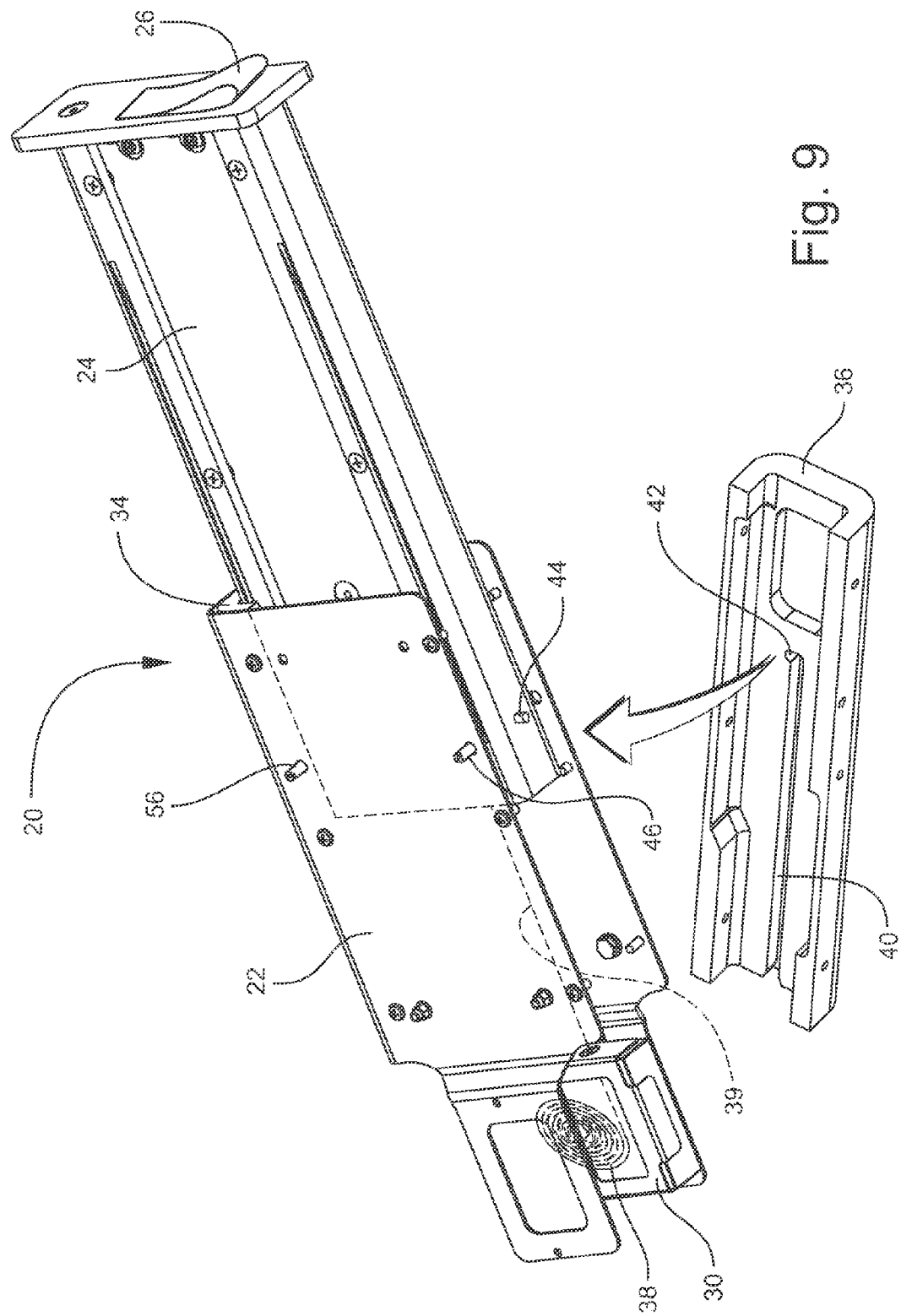
Figure 10:
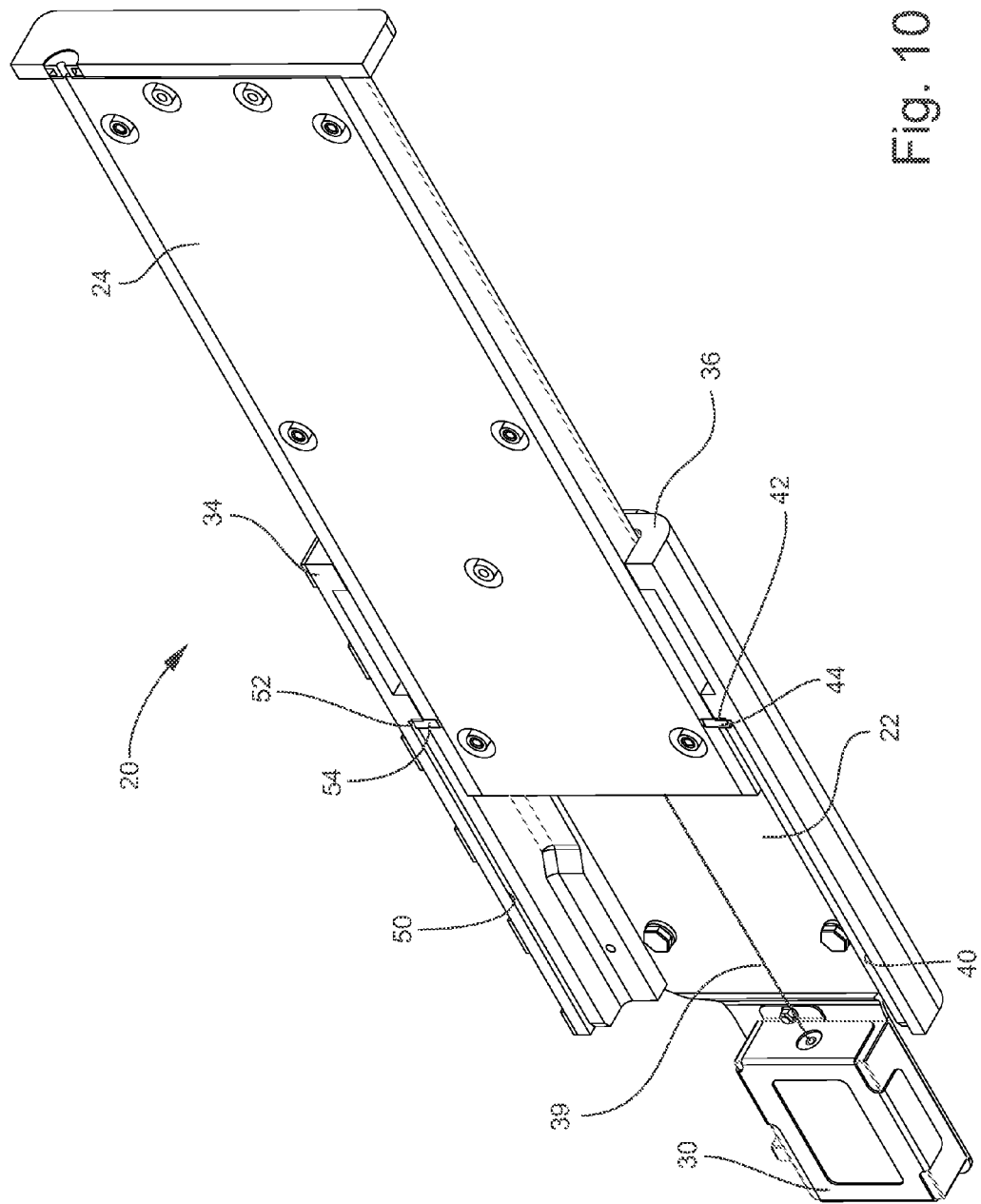

FIG. 9 is a perspective view from below, showing the leg restraint device in its deployed position, with the bottom cap removed to show the lock pin and spring-loaded pin, and their cooperation with the bottom guide slot; and FIG. 10 is a partial vertical cross-sectional perspective view from below, showing the leg restraint device in its deployed position and the position of the upper and lower locking pins in the respective upper and lower guide slots.

DETAILED DESCRIPTION OF THE PREFERRED EMBODIMENT

Referring now specifically to the drawings, the environment of the disclosure is an aircraft of the type having side-facing seats, such as seat 10, having a seat bottom 12, seat back 14 and an armrest/end bay 16. Accordingly, a seat occupant sits with his or her back to the aircraft fuselage "A", facing outward in a generally perpendicular direction in relation to the longitudinal dimension of the aircraft and its direction of forward travel. For this reason, the occupant is subject to substantial lateral g-force loading in the event of an abrupt deceleration such as might result during hard braking or a forward-directed crash event. While the upper torso and the thigh area of the legs are restrained to some extent by the armrest 16 and the seat belt 18, the lower legs are free to be projected laterally forward, rotating violently around an axis defined by the knees, causing potential serious injury to both the knees and lower legs unless they are restrained in some manner. Injury to the legs is a particularly serious concern since such injuries could prevent the passenger from being able to egress unaided from the aircraft in the event of an accident.

Figure 1:
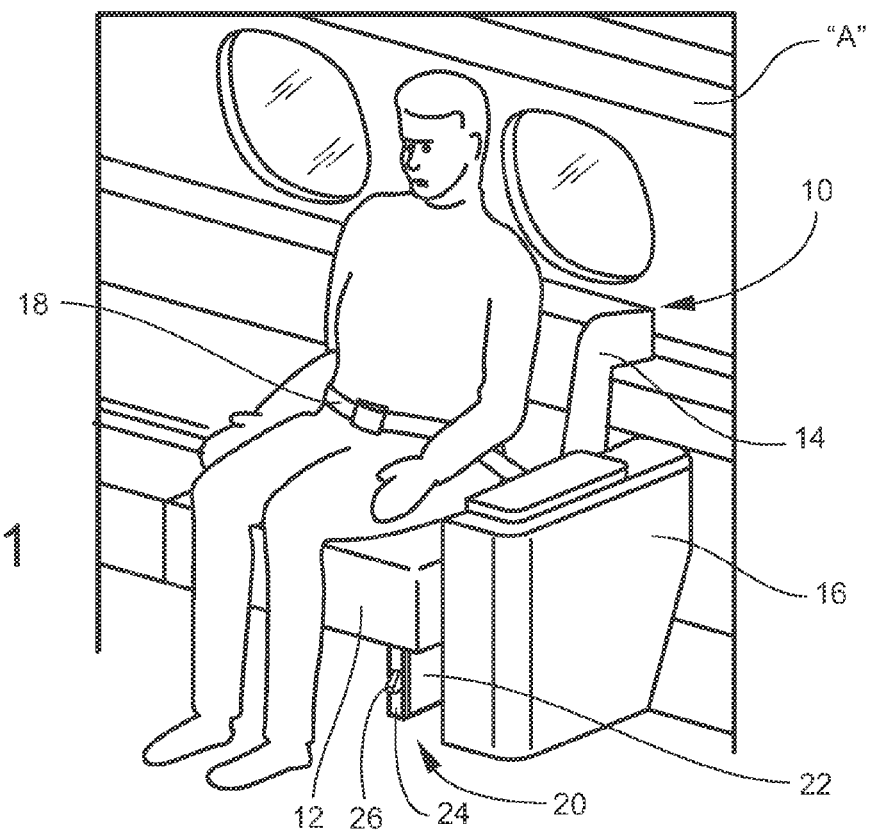
FIG. 1 is a perspective view of a side-seated aircraft seat, showing a leg restraint device according to a preferred embodiment of the invention in its retracted position.
Figure 2:
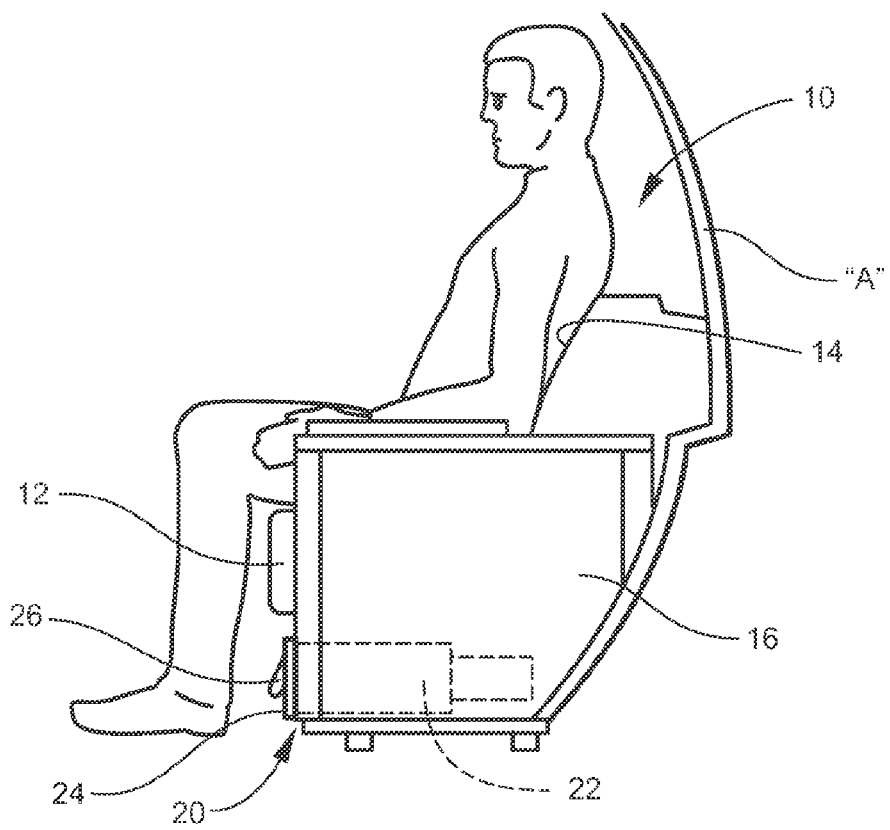
FIG. 2 is a side elevation of a side-seated aircraft seat, showing a leg restraint device according to a preferred embodiment of the invention in its retracted position.

Thus, in accordance with the invention, a leg restraint device 20 is provided. As shown in FIGS. 1 and 2, the leg restraint device 20 is mounted under the seat forward of the occupant in relation to the aircraft's direction of forward travel. The leg restraint device 20 includes two principal elements, a housing 22 mounted under the seat, and a deployable restraint panel 24.

During boarding, deplaning and normal flight, the leg restraint device remains in a retracted condition, as shown in FIGS. 1 and 2. During TTOL, or in the event of an emergency that may result in an abrupt deceleration, the restraint panel 24 is manually deployed by pulling on, for example, a strap 26 positioned on the front end of the restraint panel 24.

Figure 3:
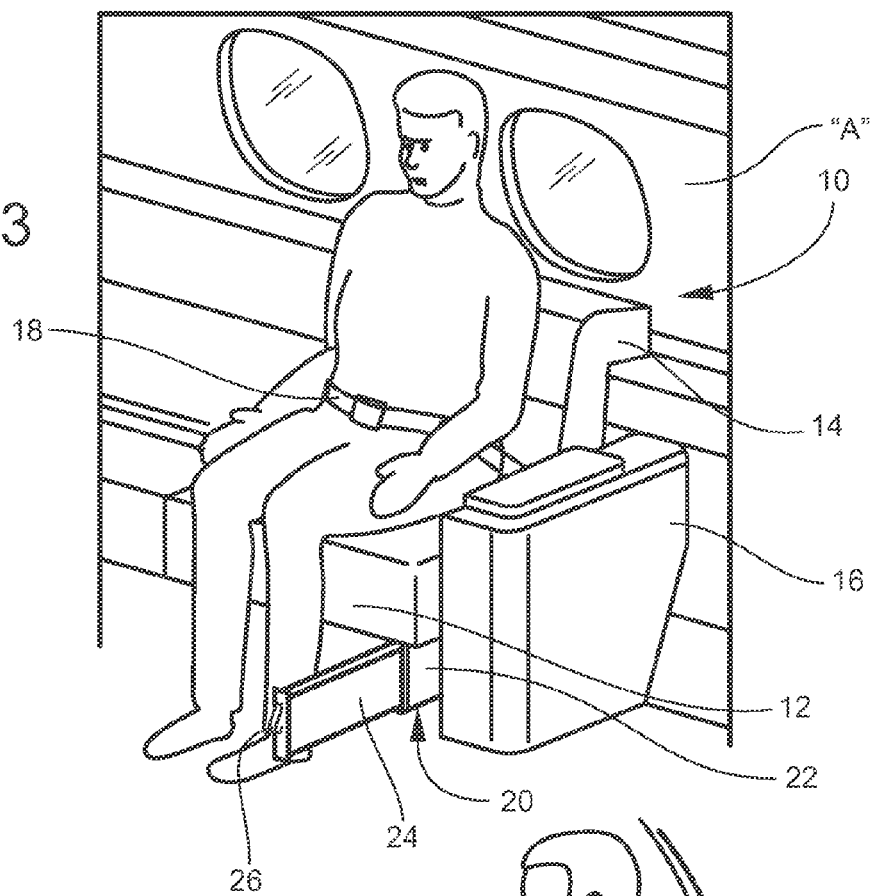
FIG. 3 is a perspective view of a side-seated aircraft seat, showing a leg restraint device according to a preferred embodiment of the invention in its deployed position.
Figure 4:
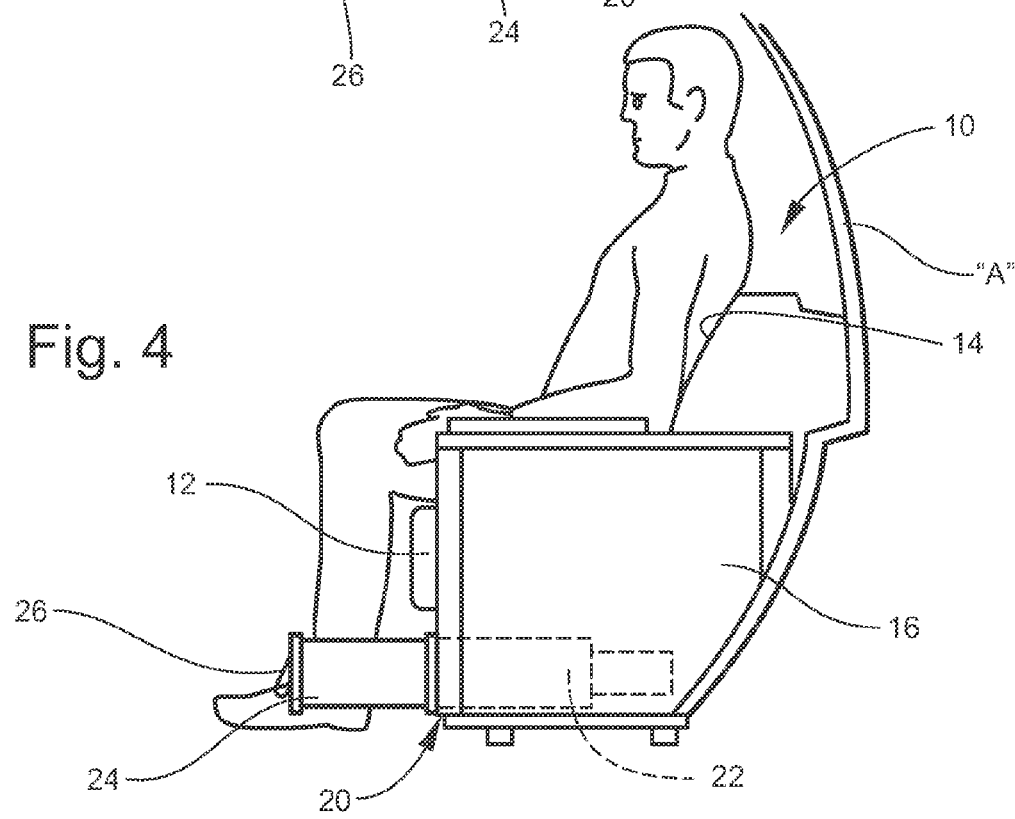
FIG. 4 is a side elevation of a side-seated seat, showing a leg restraint device according to a preferred embodiment of the invention in its deployed position.

As shown in FIGS. 3 and 4, the restraint panel 24, when deployed, projects forwardly of the seat 10 into a position where the legs of the seat occupant are positioned behind the restraint panel 24 in relation to the aircraft's direction of forward travel. In the event of an actual abrupt deceleration of the aircraft, the occupant's legs are prevented from continued unrestrained forward motion by the restraint panel 24. In a manner described below, the restraint panel 24 is caused to retract back into the housing by the action of the lower legs and feet impacting the restraint panel 24 from the side. This retraction occurs very rapidly and thus clears the area around the seat 10 for rapid, unrestricted egress by both the seat occupant and other aircraft occupants who may have to move past the seat 10 in order to egress from the aircraft.

Figure 5:
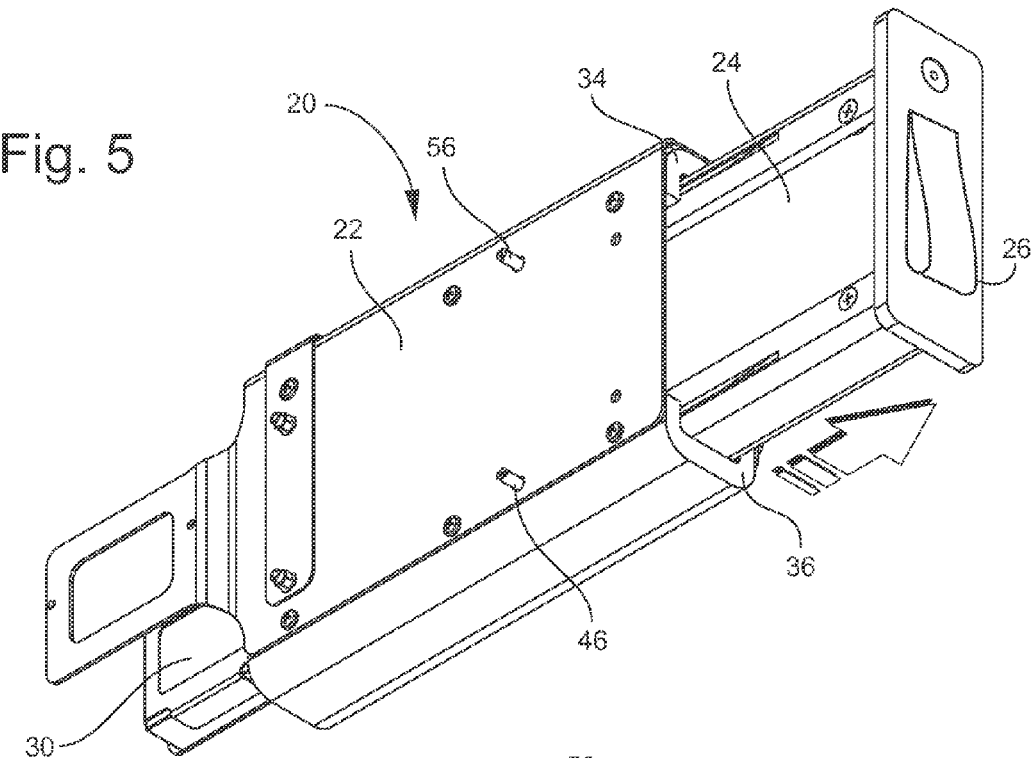
FIG. 5 is a perspective view from below, showing the leg restraint device according to a preferred embodiment of the invention in its deployed position.
Figure 6:
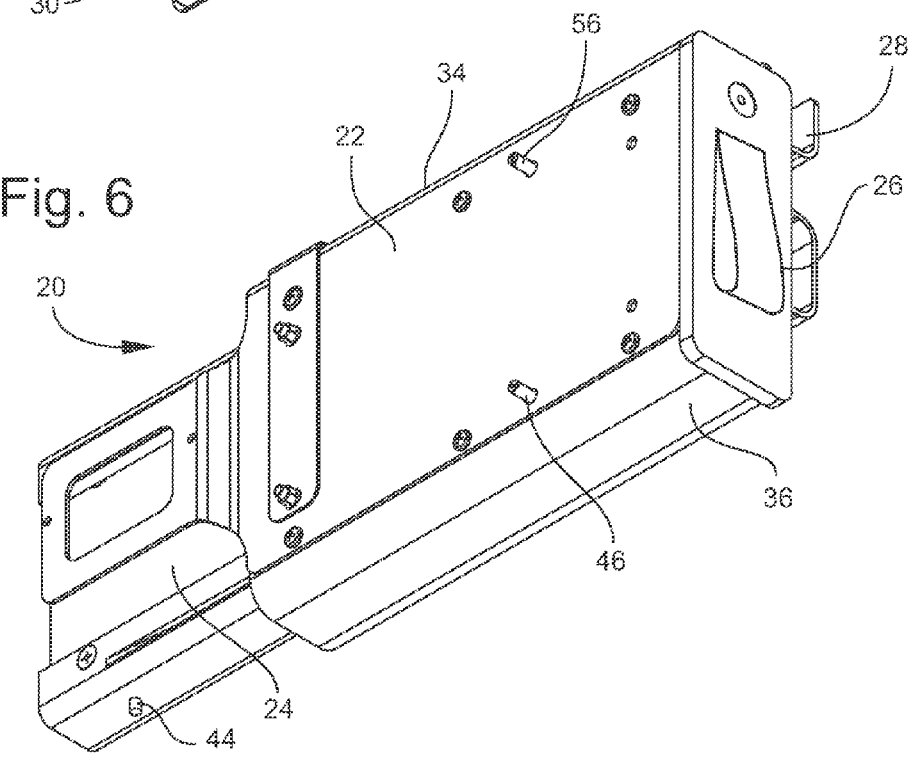
FIG. 6 is a perspective view from below, showing the leg restraint device of FIG. 5 in its retracted position.

Referring now to FIGS. 5 and 6, the leg restraint device 20 includes a seat mounting plate 28 for mounting the device 20 to the seat 10 in a position below the seat bottom 12. A retractor spring housing 30 extends rearward from the housing 22. A top cap 34 and a bottom cap 36 enclose the top and bottom of the housing 22. A coil retractor spring 38, see FIG. 9, is positioned in the retractor spring housing 30 and attached to the restraint panel 24. The spring 38 and an attached cord 39 return the panel to its retracted position by the action of the lower legs and feet impacting the restraint panel 24 from the side.

Referring now to FIGS. 9 and 10, the means by which the panel 24 is guided between its deployed and retracted states is explained. The bottom cap 36 and the top cap 34 function in the same manner. The bottom 36 is provided with a guide slot 40 in its underside. The guide slot 40 includes in its forward terminus an offset notch 42. A locking pin 44 is positioned on the bottom of the restraint panel 24 and rides in the guide slot 40. When the restraint panel 24 is pulled forward to its deployed position as shown in FIGS. 3, 4, 5, 7, 9, and 10 the locking pin 44 is pulled along the guide slot 40 until the locking pin 44 reaches the offset notch 42. The offset of the notch 42 is such that a spring-loaded biasing pin 46 pressing against the side of the panel 24 causes the locking pin 44 to move sideways into the notch 42.

In the same manner, the top cap 34 is provided with a guide slot 50 in its underside. The guide slot 50 includes in its forward terminus an offset notch 52. A locking pin 54 is positioned on the top of the restraint panel 24 and rides in the guide slot 50. When the restraint panel 24 is pulled forward to its deployed position as shown in FIGS. 3, 4, 5, 7, 9 and 10 the locking pin 54 is pulled along the guide slot 50 until the locking pin 54 reaches the offset notch 52. The offset of the notch 52 is such that a spring-loaded biasing pin 56 pressing against the side of the panel 24 causes the locking pin 54 to move sideways into the notch 52.

The deployment of the restraint panel 24 as described above is against the resistance of the retractor spring 38, which maintains its resistance, applying a rearward force against the panel 24, which is prevented from retracting by the locking pins 44 and 54 in the offset notches 42, 52. The biasing force of the biasing pins 46, 56 is sufficient to maintain the panel 24 in a position where the locking pins 44, 54 remain in the offset notches 42, 52, so long as there is no lateral force applied to the panel. In the event of an abrupt deceleration sufficient to cause a leg of the seat occupant to apply a sideways impact to the deployed panel 24, the force applied by the biasing pins, 46, 56 is overcome. The panel 24 is bumped sideways in the direction that laterally moves Locking Pins 44, 54 out of the offset notches 42, 52 in the bottom and top caps 36 and 34. The release of the locking pins 44, 54 permits the retractor spring 38 to instantly retract the panel 24 to which the locking pins 44, 54 are mounted back into the housing 22, as shown in FIGS. 1, 2, 6 and 8.

The leg restraint device 10 is therefore manually operated and requires no power source other than the mechanical retractor spring 38. It is easy to install and requires only a simple in board pull on the strap 26 to deploy. It is completely removed from egress paths when retracted.

A leg restraint device for side-seated vehicle occupants according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:

1. A leg restraint for side-seated vehicle occupants, and comprising a leg-restraining member mounted in proximity to a side-facing vehicle seat and selectively moveable in a direction perpendicular to a direction of forward travel of the vehicle between a deployed, laterally-extending leg-protecting position and a retracted, non-leg interfering position, and an impact-activated biasing member cooperating with the leg-restraining member to move the leg-restraining member into the retracted position upon impact of an occupant's leg against the leg-restraining member, wherein the leg-restraining member comprises a panel that is mounted beneath a seat bottom on a side of the seat most proximate to the direction of forward travel of the vehicle.

2. A leg restraint according to claim 1, wherein the panel has a height that is at least two times a width of the panel.

3. A leg restraint according to claim 1, and including a locking member cooperating with the leg-restraining member to retain the leg restraining member in its the deployed position.

4. A leg restraint according to claim 1, wherein the vehicle comprises an aircraft and the vehicle seat comprises an aircraft occupant seat.

5. A leg restraint for side-seated aircraft occupants, and comprising:
   (a) a leg-restraining member comprising a panel that is perpendicular to the floor of the vehicle mounted in proximity to a side-facing aircraft seat on a side of the seat most proximate to a direction of forward travel of the vehicle and selectively moveable in a direction perpendicular to the direction of forward travel between a deployed, laterally-extending leg-protecting position during taxi, take-off, and landing (TTOL) and a retracted, non-leg interfering position;

(b) an impact-activated biasing member cooperating with the leg-restraining member to move the leg-restraining member into the retracted position upon impact of an occupant's leg against the leg-restraining member; and (c) a locking member cooperating with the leg-restraining member to retain the leg restraining member in the deployed position against a biasing force towards the retracted position until an impact of an occupant's leg against the leg-restraining member.

6. A leg restraint for side-seated aircraft occupants, and comprising:

(a) a leg-restraining member mounted in proximity to a side-facing aircraft seat and selectively moveable between a deployed, laterally-extending leg-protecting position during taxi, take-off, and landing (TTOL) and a retracted, non-leg interfering position, wherein the leg-restraining member comprises a panel mounted beneath a seat bottom of the aircraft seat;

(b) an impact-activated biasing member cooperating with the leg-restraining member to move the leg-restraining member into the retracted position upon impact of an occupant's leg against the leg-restraining member, wherein the impact-activated biasing member comprises a spring cooperating with the panel; and (c) a locking member cooperating with the leg-restraining member to retain the leg restraining member in the deployed position against a biasing force towards the retracted position until an impact of an occupant's leg against the leg-restraining member, wherein the locking member comprises a locking pin carried by the panel and mounted for movement in a guide slot formed in a cap mounted on the panel, the guide slot including a notch offset to one side of the guide slot and positioned to capture the locking pin upon deployment of the panel to retain the panel in the deployed position against a biasing force applied to the panel towards the retracted position.

7. A leg restraint according to claim 6, wherein:

(a) the panel is mounted in an elongate panel housing positioned beneath the seat bottom of the vehicle on a side of the seat most proximate to a direction of forward travel of the aircraft, and moveable between a deployed, laterally-extending leg-protecting position during TTOL and a retracted, non-leg interfering position;

(b) the spring comprises a coil spring mounted in a spring housing mounted on the panel housing such that as the panel is deployed, the coil spring is uncoiled and when the panel is retracted, the coil spring coils;

(c) a top locking pin is carried by a top side of the panel and mounted for movement in a guide slot formed in a top cap mounted on the top side of the panel, the top guide slot including a notch positioned to capture the top locking pin upon deployment of the panel to retain the panel in the deployed position against a biasing force applied to the panel towards the retracted position;

(d) a bottom locking pin is carried by a bottom side of the panel and mounted for movement in a guide slot formed in a bottom cap mounted on the bottom side of the panel, the bottom guide slot including a notch positioned to capture the bottom locking pin upon deployment of the panel to retain the panel in the deployed position against a biasing force applied to the panel towards the retracted position.

8. A leg restraint according to claim 7, and including at least one laterally-positioned biasing member carried by the panel housing and imposing a lateral bias against the panel in a direction to maintain the locking pin in the notch in an offset position to one side of the guide slot when the panel is in the deployed position.

9. A leg restraint according to claim 8, wherein laterally-positioned biasing member comprises a spring-loaded pin adapted to be positioned in an extended position against the panel when the panel is in the deployed position, and to be moved into a retracted position against the panel by the action of the panel upon lateral deflection of the panel incident to impact by a leg of the seat occupant.

10. A leg restraint according to claim 6, wherein: the panel has a height that is at least two times a width of the panel.

* * * * *

UNITED STATES PATENT AND TRADEMARK OFFICE
CERTIFICATE OF CORRECTION

PATENT NO.        : 8,955,914 B2                           Page 1 of 1
APPLICATION NO.   : 13/907079
DATED             : February 17, 2015
INVENTOR(S)       : Pete C. Meister and Michael J. Farvet It is certified that error appears in the above-identified patent and that said Letters Patent is hereby corrected as shown below:

In the Claims

In column 6, line 52, delete the word "its" after the word in.

Signed and Sealed this
Twenty-third Day of June, 2015

Michelle K. Lee
*Director of the United States Patent and Trademark Office*